(12) United States Patent
Kim et al.

(10) Patent No.: US 9,505,961 B2
(45) Date of Patent: Nov. 29, 2016

(54) ACRYLIC PRESSURE SENSITIVE ADHESIVE COMPOSITION, PROTECTION FILM INCLUDING THE SAME, POLARIZER AND LIQUID CRYSTAL DISPLAY

(75) Inventors: No-Ma Kim, Daejeon (KR); Jae-Gwan Lee, Daejeon (KR); An-Na Lee, Daejeon (KR); Suk-Ky Chang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 354 days.

(21) Appl. No.: 12/738,957

(22) PCT Filed: Dec. 9, 2008

(86) PCT No.: PCT/KR2008/007279
§ 371 (c)(1),
(2), (4) Date: Apr. 20, 2010

(87) PCT Pub. No.: WO2009/075512
PCT Pub. Date: Jun. 18, 2009

(65) Prior Publication Data
US 2010/0209631 A1 Aug. 19, 2010

(30) Foreign Application Priority Data
Dec. 12, 2007 (KR) .................. 10-2007-0129061

(51) Int. Cl.
C09K 19/52 (2006.01)
C09J 133/14 (2006.01)
C09J 7/02 (2006.01)
G02B 5/30 (2006.01)

(52) U.S. Cl.
CPC ............. *C09J 133/14* (2013.01); *C09J 7/0217* (2013.01); *B32B 2457/202* (2013.01); *C08L 2312/00* (2013.01); *C09J 2203/318* (2013.01); *G02B 5/3025* (2013.01); *G02F 2202/28* (2013.01); *Y10T 428/1059* (2015.01); *Y10T 428/1077* (2015.01); *Y10T 428/263* (2015.01); *Y10T 428/2848* (2015.01)

(58) Field of Classification Search
CPC ........... G02F 1/1335; G02F 1/133528; G02F 2202/28; G02B 5/30; G02B 5/3025; G02B 5/3041; G02B 5/305; C09J 7/0207; C09J 7/0217; C09J 133/08; C09J 133/10; C09J 133/14; C09J 2203/318; C08F 120/18; C08L 2312/00; B32B 2457/202; Y10T 428/1059; Y10T 428/1077; Y10T 428/263; Y10T 428/2848
USPC ........... 156/106, 247; 349/96–103, 122–138; 427/208, 207.1, 208.4, 208.6, 208.8; 428/1.3, 1.5, 1.1, 355 R, 355 EN, 428/355 BL, 355 AC, 356, 524; 524/236, 524/356, 555, 556; 525/329.9, 330.5; 526/931
See application file for complete search history.

(56) References Cited

U.S. PATENT DOCUMENTS

| | | | | |
|---|---|---|---|---|
| 4,759,983 A | * | 7/1988 | Knutson et al. | 428/343 |
| 4,908,403 A | * | 3/1990 | Spada et al. | 524/818 |
| 5,362,816 A | * | 11/1994 | Snyder et al. | 525/329.9 |
| 2003/0129390 A1 | | 7/2003 | Husemann et al. | |
| 2005/0244633 A1 | * | 11/2005 | Kobayashi | C09J 7/0217 428/355 R |
| 2006/0045990 A1 | * | 3/2006 | Kim et al. | 428/1.1 |
| 2006/0074163 A1 | * | 4/2006 | Tye | 524/413 |
| 2006/0279922 A1 | * | 12/2006 | Cho et al. | 361/683 |
| 2007/0055006 A1 | * | 3/2007 | Kim et al. | 524/556 |
| 2011/0187970 A1 | * | 8/2011 | Kim et al. | 349/96 |

FOREIGN PATENT DOCUMENTS

| | | | | |
|---|---|---|---|---|
| JP | 47-17640 | | 5/1972 | |
| JP | 05140519 A | * | 6/1993 | ............ B32B 27/18 |
| JP | 07300444 A | * | 11/1995 | ............ C07C 69/96 |
| JP | 7-325538 | | 12/1995 | |
| JP | 11-349910 | | 12/1999 | |
| JP | 2005-97451 | | 4/2005 | |
| JP | 2005-290264 A | | 10/2005 | |
| JP | 2006-327986 A | | 12/2006 | |
| JP | 2006327986 A | * | 12/2006 | |
| JP | 2007-100043 A | | 4/2007 | |
| KR | 20040030919 A | * | 4/2004 | ............ C08K 5/0075 |
| KR | 20060128659 A | * | 12/2006 | ............ C09J 133/14 |
| WO | WO 2006/137559 A1 | | 12/2006 | |

OTHER PUBLICATIONS

Mendez-Vivar et al., The Role of 2-(methacryloyloxy)ethyl Acetoacetate in the Polymerization of Hybrid Multicomponent (Si, Ti, Zr) Sols, 2002, Journal of Sol-Gel Science and Technology, 25, 249-254.*
Shinji et al., Machine Translation of JP 07300444 A, 1995.*
Michio et al., Machine Translation of JP 2006327986 A, 2006.*

* cited by examiner

*Primary Examiner* — Ellen S Wood
*Assistant Examiner* — Eli D Strah
(74) *Attorney, Agent, or Firm* — Dentons US LLP

(57) ABSTRACT

The present invention relates to an acrylic pressure sensitive adhesive composition comprising a monomer containing linear carbonate having an antistatic property. The acrylic pressure sensitive adhesive composition exhibits an excellent balance between low-rate peel strength and high-rate peel strength, and is capable of lowering the content of an antistatic agent. It also provides excellent releasable property, and protection of the surface of a polarizer due to proper wettability.

15 Claims, No Drawings

ACRYLIC PRESSURE SENSITIVE ADHESIVE COMPOSITION, PROTECTION FILM INCLUDING THE SAME, POLARIZER AND LIQUID CRYSTAL DISPLAY

This application claims the benefit of PCT/KR2008/007279, filed Dec. 9, 2008 and claims priority to Korean Application No: 10-2007-0129061, filed Dec. 12, 2007, all of which are hereby incorporated by reference herein in their entireties.

TECHNICAL FIELD

The present invention relates to an acrylic pressure sensitive adhesive composition, a protection film, a polarizer and a liquid crystal display comprising the same, and more particularly, to an acrylic pressure sensitive adhesive composition capable of exhibiting a stable antistatic function of an adhesive, solving the problem concerning the transfer effect of additives, and the low-rate peel strength.

BACKGROUND ART

Generally, protection films are widely used to protect surfaces of metal products, plastic plates and polarizers for electronic materials. Acrylic pressure sensitive adhesives are widely used as adhesives for such protection films because of transparency and their resistance to corrosion. The acrylic pressure sensitive adhesives currently used are copolymers prepared by copolymerization of a (meth) acrylic acid alkyl ester monomer with a monomer having a functional group such as a carboxyl, hydroxyl, or epoxy group, which are crosslinked with a polyisocyanate compound, a melamine resin, or an epoxy resin. The surface-protection films are provided not only to protect adherends such as polarizing films, plastic plates, electrical/electronic appliances or automobiles from static electricity but also to protect them from contamination by dust, etc. Therefore, the antistatic properties as well as the peel strength beyond a certain level of adhesion are very important characteristics for the surface-protection film.

Generally, static electricity is generated by frictional charging when two different objects are rubbed together, and peel charging when two adhered objects are detached from each other. Such static electricity can result in adsorption of contaminants such as dust, electrostatic breakdown of devices, malfunction of measurement instruments, and fire. Particularly, with increasing demand for liquid crystal displays fueled by the growing market for computers, liquid crystal TVs, multifunctional mobile phones, etc., integrated accessory devices are more vulnerable to static electricity, and thus prevention of static electricity in liquid crystal displays has become a matter of concern. In a process of manufacturing a large liquid crystal display using a large polarizer, peeling off a release film from the polarizer generates excessive static electricity, which affects the orientation of liquid crystals in the liquid crystal display and causes defects in picture images.

In order to prevent the generation of static electricity, an antistatic layer can be formed on an outer surface of the polarizer or a base film of the protection film. However, this is not very effective and does not prevent the generation of static electricity from the beginning. Therefore, in order to fundamentally prevent the generation of static electricity, it is important for the pressure sensitive adhesive to have an antistatic property.

A conventional acrylic pressure sensitive adhesive includes a chelate compound and a metal salt as additives to achieve the antistatic property. However, when a large amount of chelate compound is added, the additives are transferred to an adherend when the pressure sensitive adhesive has been applied.

To be specific, conventional methods for imparting an antistatic property to a pressure sensitive adhesive include: a method of adding conductive metal powder or materials having conductive components such as carbon particles to a resin; and a method of adding surfactant-type ionic or non-ionic materials. However, these methods require a large amount of additive, thereby degrading a pressure sensitive adhesive property by migration of the additive to the surface of the pressure sensitive adhesive.

Japanese Patent Publication No. 1993-140519 discloses a method of preventing generation of static electricity by adding an ethylene oxide-modified phthalic acid dioctyl plasticizer to yield a pressure sensitive adhesive with flexibility. However, this method has the problems of migration to the surface of the polarizer and not eliminating static electricity generated in the first place.

Korean Patent Publication No. 2004-0030919 discloses a method of preventing generation of static electricity by adding 5 wt % or more organic salt. However, this method requires a large amount of expensive organic salt.

Korean Patent Publication No. 2006-0128659 discloses a method of preventing chlorosis under high temperature and high humidity conditions by adding a chelating agent capable of forming a complex with a metal ion, and a metal salt to an acrylic pressure sensitive adhesive. However, this method also has a problem of a decrease in low-rate peel strength due to a large amount of additive.

DISCLOSURE

Technical Problem

The present invention is directed to providing an acrylic pressure sensitive adhesive composition which prevents transfer or migration of an additive to the surface of the pressure sensitive adhesive after the adhesive has been applied, and stably exhibits an excellent antistatic property. The acrylic pressure sensitive adhesive is endowed with an antistatic property by introducing a resin compound having an antistatic function using a small amount of additive or without adding an additive. Therefore, it can prevent a decrease in peel strength resulting from the conventional technique, and can reduce production costs since less expensive additive is used.

Technical Solution

One aspect of the present invention provides an acrylic pressure sensitive adhesive composition comprising: an acrylic copolymer prepared by copolymerization of a compound represented by Formula 1:

[Formula 1]

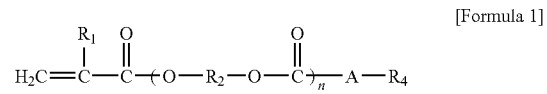

In Formula 1, A is an atom group represented by —O—,

$R_1$ is hydrogen or alkyl; $R_2$ is alkylene, alkenylene, alkynylene or cycloalkylene; $R_3$ is alkylene, alkenylene, alkynylene or cycloalkylene; $R_4$ is aryl, alkyl, alkenyl, alkynyl, alkoxy or alkoxyalkyl; m is 0 or an integer from 1 to 6; and n is an integer from 1 to 100.

The acrylic pressure sensitive adhesive composition may further comprise a chelating agent capable of forming a complex with a metal ion, and a metal salt. The acrylic pressure sensitive adhesive may further comprise a cross-linking agent.

Another aspect of the present invention provides a protection film comprising: a base; and an adhesive layer containing the acrylic pressure sensitive adhesive composition according to the present invention applied to one or both surfaces of the base.

Still another aspect of the present invention provides a polarizer comprising: a polarizing film; and an adhesive layer containing the acrylic pressure sensitive adhesive composition according to the present invention applied to one or both surfaces of the polarizing film.

Yet another aspect of the present invention provides a liquid crystal display comprising: a liquid crystal panel in which the polarizer according to the present invention is adhered to one or both surfaces of a liquid crystal cell.

BEST MODE

Hereinafter, exemplary embodiments of the present invention will be described in detail. The present invention relates to a pressure sensitive adhesive composition comprising an acrylic copolymer containing a compound represented by Formula 1:

[Formula 1]

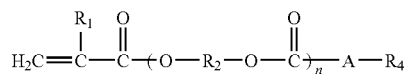

Here, A is an atom group represented by —O—,

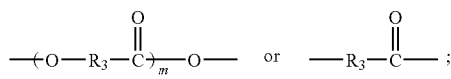

$R_1$ is hydrogen or alkyl; $R_2$ is alkylene, alkenylene, alkynylene or cycloalkylene; $R_3$ is alkylene, alkenylene, alkynylene or cycloalkylene; $R_4$ is aryl, alkyl, alkenyl, alkynyl, alkoxy or alkoxyalkyl; m is 0 or an integer from 1 to 6, and n is an integer from 1 to 100.

Among the substituents mentioned above, the alkyl group may be C1-C12 alkyl, preferably, C1-C10 alkyl, and more preferably, C1-C4 alkyl.

The alkenyl group may be C2-C12 alkenyl, preferably, C2-C10 alkenyl, and more preferably, C2-C4 alkenyl.

The alkynyl group may be C2-C12 alkynyl, preferably C2-C10 alkynyl, and more preferably, C2-C4 alkynyl.

The alkylene group may be C1-C20 alkylene, and preferably, C1-C10 alkylene.

The alkenylene group may be C2-C20 alkenylene, and preferably, C2-C10 alkenylene.

The alkynylene group may be C2-C20 alkynylene, and preferably, C2-C10 alkynylene.

The cycloalkylene group may be a bivalent hydrocarbon group containing 3 to 6-membered cycloalkyl, and having 3 to 20 carbon atoms and preferably, 3 to 10 carbon atoms.

The aryl group may be a 5 to 12-membered aromatic ring compound, which is an alkyl-substituted or unsubstituted phenyl, biphenyl, or naphthyl ring system, and the like.

The alkoxy group may be C1-C12 alkoxy, preferably, C1-C10 alkoxy, and more preferably, C1-C4 alkoxy.

The alkoxyalkyl group may be C1-C12 alkoxyalkyl, preferably, C1-C10 alkoxyalkyl, and more preferably, C1-C4 alkoxyalkyl.

More specifically, the compound represented by Formula 1 includes a compound represented by one of Formulae 2 to 4:

[Formula 2]

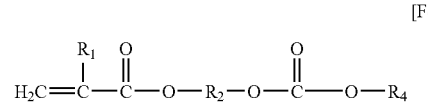

Here, $R_1$ is hydrogen or methyl; $R_2$ is C1-C10 alkylene; and $R_4$ is phenyl, benzyl, C1-C10 alkyl, or C1-C10 alkoxyalkyl.

[Formula 3]

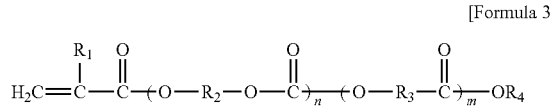

Here, $R_1$ is hydrogen or C1-C10 alkyl; $R_2$ and $R_3$ are independently C1-C10 alkylene; $R_4$ is phenyl, benzyl, C1-C10 alkyl, or C1-C10 alkoxyalkyl; m is 0 or an integer from 1 to 6; and n is an integer from 1 to 100. Also, in Formula 3, when m is 0, n is an integer from 2 to 100.

[Formula 4]

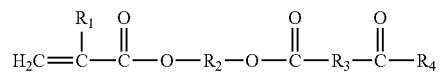

Here, $R_1$ is hydrogen or methyl; $R_2$ is C1-C10 alkylene; $R_3$ is a single bond or C1-C10 alkylene; $R_4$ is C1-C10 alkyl or alkoxyalkyl.

The acrylic copolymer prepared by copolymerization of the compound represented by Formula 1 may comprise: i) 90 to 99.9 parts by weight of a (meth)acrylic acid ester monomer having C1-C12 alkyl; and ii) 0.1 to 10 parts by weight of the compound represented by Formula 1.

The (meth)acrylic acid ester monomer having C1-C12 alkyl may be C1-C12 alky ester derived from acrylic acid (or methacrylic acid), and specifically, at least one selected from the group consisting of methyl(meth)acrylate, ethyl(meth)acrylate, n-propyl(meth)acrylate, isopropyl(meth)acrylate, n-butyl(meth)acrylate, t-butyl(meth)acrylate, sec-butyl (meth)acrylate, pentyl(meth)acrylate, 2-ethylhexyl(meth)acrylate, n-octyl(meth)acrylate, isooctyl(meth)acrylate, isononyl(meth)acrylate, lauryl(meth)acrylate, and tetradecyl (meth)acrylate. If the alkyl group has more carbon atoms than specified above, it is understood that the glass transition temperature (Tg) of the pressure sensitive adhesive increases or adhesion of the pressure sensitive adhesive is difficult to control.

The content of the (meth)acrylic acid ester monomer having C1-C12 alkyl may be 90 to 99.9 parts by weight, however it is not particularly limited. When the content is less than 90 parts by weight, it can affect an adhesion property, but when the content is more than 99.9 parts by weight, it can adversely affect balances between all kinds of properties. In addition, the content of the compound represented by Formula 1 is not particularly limited, but when the content is less than 0.1 parts by weight, it is difficult to obtain desired adhesion. On the contrary, when the content is more than 10 parts by weight, high-rate peel strength can be increased.

The acrylic copolymer may further comprise iii) 0.1 to 10 parts by weight of a monomer having a crosslinkable functional group in order to control adhesion and cohesion.

The monomer with the crosslinkable functional group includes a vinyl or acrylic ester monomer, in which an acidic group, a hydroxyl group or a nitrogen atom may be contained.

The vinyl monomer having an acidic group is a component providing cohesion resulting from chemical bonds by reaction with a crosslinking agent in order to prevent cohesive failure of the pressure sensitive adhesive at high temperature.

The copolymeric monomer having an acidic group may include at least one selected from the group consisting of a copolymeric monomer having a carboxyl group and its anhydride, a copolymeric monomer having a sulfonic acid group and a copolymeric monomer having a phosphoric acid group.

The copolymeric monomer having a carboxyl group may be (meth)acrylic acid, carboxyethylacrylate, carboxypentylacrylate, itaconic acid, maleic acid, fumaric acid or crotonic acid.

The anhydride derived from the copolymeric monomer having a carboxyl group may be maleic acid anhydride or itaconic acid anhydride.

The copolymeric monomer having a sulfonic acid group may be styrene sulfonic acid, aryl sulfonic acid, 2-(meth)acrylamide-2-methyl propane sulfonic acid, (meth)acrylamide propane sulfonic acid, sulfopropyl (meth)acrylate, or (meth)acryloyl oxynaphthalene sulfonic acid.

The copolymeric monomer having a phosphoric acid group may be 2-hydroxy ethyl acryloyl phosphate. However, the present invention is not limited to these examples.

The copolymeric monomer having a hydroxide group may include at least one selected from the group consisting of hydroxyalkyl(meth)acrylates such as 2-hydroxyethyl (meth)acrylate, 2-hydroxypropyl(meth)acrylate, and 4-hydroxybutyl(meth)acrylate, and hydroxyalkyleneglycol (meth)acrylates such as 2-hydroxyethyleneglycol(meth) acrylate and 2-hydroxyproyleneglycol(meth)acrylate.

The copolymeric monomer having nitrogen may be acryl amide, N-vinyl pyrrolidone, or N-vinyl caprolactame, but the present invention is not limited to these examples.

The content of the monomer having a crosslinkable functional group is not particularly limited and may be 0.1 to 10 parts by weight. When the content is less than 0.1 parts by weight, cohesive failures easily occur at high temperature and high humidity, and when the content is more than 10 parts by weight, compatibility is decreased, resulting in a decrease in liquidity.

The acrylic copolymer may further include a functional monomer, represented by Formula 5, which is contained at 0 to 20 parts by weight of the total weight of the monomer as a random component to control the glass transition temperature of the pressure sensitive adhesive or to provide other functions.

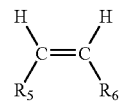

[Formula 5]

Here, $R_5$ is hydrogen or alkyl, and $R_6$ is cyano or alkyl-substituted or unsubstituted phenyl, acetyloxy, or $COR_7$. Here, $R_7$ is alkyl-substituted or unsubstituted amino or glycidyloxy.

To define $R_5$ to $R_7$, the alkyl group may be C1-C6 lower alkyl, and preferably, methyl or ethyl.

The compound of Formula 5 may be a styrene monomer such as styrene or alpha-methyl styrene; carbonic acid vinyl ester such as vinyl acetate; or a nitrogen-containing vinyl monomer such as acrylonitrile, (meth)acryl amide, (meth) acryl amide, N-methyl(meth)acrylamide, N-butoxymethyl (meth)acrylamide, or glycidyl(meth)acrylate, but the present invention is not limited thereto, and the monomers may be used independently or jointly.

When there is too much of the functional monomer of Formula 5, flexibility and peel strength of the composition are decreased, and thus the preferable content of the functional monomer used is less than 20 parts by weight for the total content of the monomer components.

The acrylic copolymer may be prepared by a common method such as solution polymerization, photo-polymerization, bulk polymerization, suspension polymerization or emulsion polymerization, and preferably, solution polymerization. It is also preferred to set the temperature between 50 and 120° and to add an initiator after monomers are homogenized. As the polymerization initiator, an azopolymerization initiator such as azobisisobutyronitrile or azobiscyclohexane carbonitrile, and/or peroxide such as benzoyl peroxide or acetyl peroxide may be used independently or jointly.

The acrylic pressure sensitive adhesive composition according to the present invention may further include a chelating agent capable of forming a bond with a metal ion, and thereby forming a complex with a metal ion; and a metal salt. The chelating agent capable of forming a complex with a metal ion, and the metal salt inhibit the generation of static electricity.

The chelating agent used in the present invention is a compound having a functional group capable of forming a complex with a metal ion in its molecular structure, which is linked with a cation of the metal salt dissociated into a cation and an anion, resulting in formation of a stabilized chelating complex. Thus, the anion concentration of the metal salt in the pressure sensitive adhesive is increased, resulting in exhibition of ionic conductivity in the pressure sensitive adhesive composition. The ionic conductivity endows the pressure sensitive adhesive composition with conductivity, and reduces static electricity generated by peeling-off of the release film protecting the adhesive layer and peeling-off of the protection film adhered to the adherend, thereby lowering a peeling static voltage.

The present invention is not limited to a specific kind of chelating agent, but it is preferably a compound exhibiting high solubility in a common organic solvent such as ethylacetate, toluene, methylethylketone, acetone or alcohol, and excellent compatibility with an acrylic pressure sensitive adhesive. To be specific, as the chelating agent, compounds having an oxalate group, diamine group, polyhydric carboxyl group and ketone group may be used independently or jointly. The preferable chelating agent may be a compound having an oxalate group.

The compound having an oxalate group may be a compound represented by Formula 6:

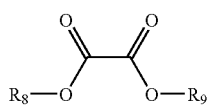

[Formula 6]

Here, $R_8$ and $R_9$ are independently hydrogen, halogen, linear or branched C1-C20 alkyl, linear or branched C1-C20 alkoxy, linear or branched C2-C20 alkenyl, C6-C30 aryl, C6-C30 arylalkyl, C6-C30 aryloxy or C5-C20 cycloalkyl.

The compound represented by Formula 6 may be diethyloxalte, dimethyloxalate, dibutyloxalate, di-tert-butyloxalate, or bis(4-methylbenzyl)oxalate.

The compound having a diamine group may be a compound represented by Formula 7:

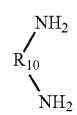

[Formula 7]

Here, $R_{10}$ is linear or branched C2-C10 alkylene, or linear or branched C2-C10 alkenylene.

The compound represented by Formula 7 may be ethylenediamine, 1,2-diaminopropane or diaminobutane.

The compound having a polyhydric carboxyl group may be a compound having a polycarboxic acid or carboxylate group, and preferably, a compound having a functional group represented by Formula 8A, 8B or 8C:

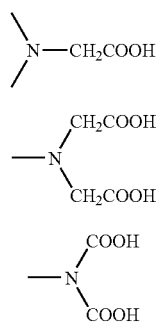

[Formula 8A]

[Formula 8B]

[Formula 8C]

The compound having a functional group represented by Formula 8A or 8B may be ethylenediamine-N,N,N',N'-tetraacetic acid (EDTA), N,N,N',N'',N''-diethylenetriaminepentaacetic acid (DTPA), 1,4,7,10-tetraazacyclododecane-N,N',N'',N'''-tetraacetic acid (DOTA), 1,4,7,10-tetraazacyclododecane-N,N',N'',N'''-triacetic acid (DO3A), trans (1,2)-cyclohexanodiethylenetriaminepentaacetic acid or N,N-bis(carboxymethyl)glycine.

The compound having a functional group represented by Formula 8C may be one of the compounds represented by Formulae 8CA to 8CE:

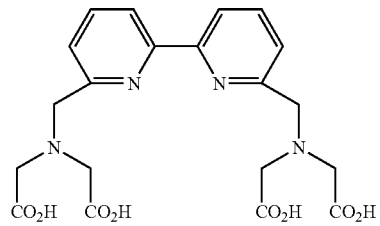

[Formula 8CA]

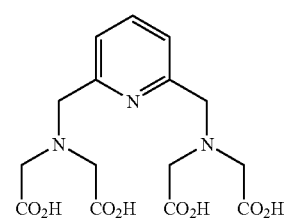

[Formula 8CB]

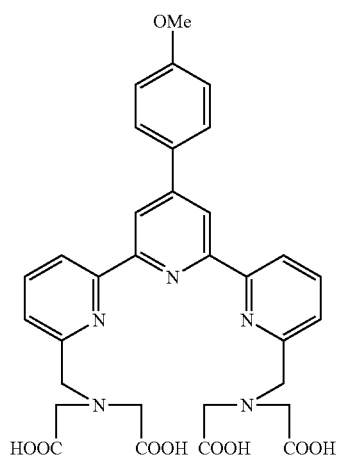

[Formula 8CC]

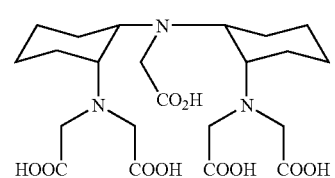

[Formula 8CD]

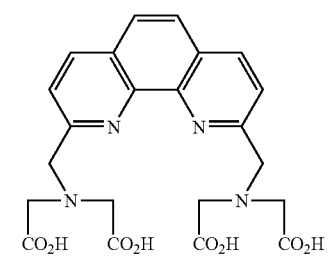

[Formula 8CE]

Meanwhile, the compound having a beta-ketone group may be a compound represented by Formula 9:

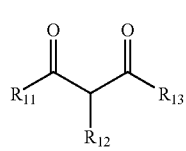

[Formula 9]

Here, $R_{11}$ and $R_{12}$ are independently linear or branched C1-C20 alkyl, linear or branched C1-C20 alkoxy, linear or branched C1-C20 alkenyl, C6-C30 aryl, C6-C30 arylalkyl, C6-C30 aryloxy, or C5-C20 cycloalkyl.

$R_{13}$ is linear or branched C1-C20 alkyl, linear or branched C1-C20 alkoxy, linear or branched C1-C20 alkenyl, C6-C30 aryl, C6-C30 arylalkyl, C6-C30 aryloxy, or C5-C20 cycloalkyl.

The compound represented by Formula 9 may be 2,4-pentadione, 1-benzoyl acetone, or ethyl acetoacetate.

The content of the chelating agent may be 0.01 to 10 parts by weight for 100 parts by weight of the acrylic copolymer. When the content is less than 0.01 parts by weight, it cannot properly form a complex with the metal salt, resulting in reduced antistatic properties, and when the content is more than 10 parts by weight, the cohesion of the pressure sensitive adhesive is decreased, resulting in reduced durability.

The metal salt used herein includes a metal cation forming a complex with a chelating agent. The metal salt may be a compound in which a metal ion is easily dissociated from the salt when mixed with a solvent or a chelating agent. Here, the dissociated metal ion preferably has a small diameter and lower dissociation energy.

The metal salt may be composed of a metal cation selected from the group consisting of lithium, sodium, potassium, magnesium, calcium, barium and cesium, and preferably, an alkali metal cation, and an anion selected from the group consisting of $Cl^-$, $Br^-$, $I^-$, $BF_4^-$, $PF_6^-$, $AsF^-$, $ClO_4^-$, $NO_2^-$, $CO_3^-$, $N(CF_3SO_2)_2^-$, $N(CF_3CO)_2^-$, $N(C_2F_5SO_2)^-$, $N(C_2F_5CO)_2^-$, $N(C_4F_9SO_2)_2^-$, $C(CF_3SO_2)_3^-$ and $CF_3SO_3^-$.

The content of the metal salt may be 0.001 to 10 parts by weight for 100 parts by weight of the acrylic copolymer containing the compound represented by Formula 1. When the content is less than 0.001 parts by weight, the metal salt cannot properly form a complex with the chelating agent, resulting in reduced antistatic properties, and when the content is more than 10 parts by weight, crystallization occurs, resulting in reduced transparency and durability.

The acrylic pressure sensitive adhesive composition may further include a crosslinking agent. The crosslinking agent may control adhesion of the pressure sensitive adhesive depending on the amount of the crosslinking agent used, and may enhance cohesion of the pressure sensitive adhesive by reacting with a carboxyl or hydroxyl group.

As the crosslinking agent, an isocyanate, epoxy, aziridine, or metal chelating agent, and preferably, an iosocyanate compound may be used.

Specifically, the isocyanate compound may be tolylene diisocyanate, xylene diisocyanate, diphenylmethane diisocyanate, hexamethylene diisocyanate, isophorone diisocyanate, tetramethyl xylene diisocyanate, naphthalene diisocyantate, or their reactants with polyol such as trimethylolpropane.

The epoxy compound may be ethyleneglycol diglycidylether, triglycidylether, trimethylolpropane triglycidylether, N,N,N,N-tetraglycidylethylenediamine, or glycerine diglycidylether.

The aziridine compound may be N,N-toluene-2,4-bis(1-aziridinecarboxide), N,N-diphenylmethane-4,4-bis(1-aziridinecarboxide), trimethylenemelamine, bisisoprotaloly-1-(2-methylaziridine), or tri-1-aziridylphosphineoxide.

The content of the crosslinking agent may be 0.5 to 5.0 parts by weight for 100 parts by weight of the acrylic copolymer. When the content is less than 0.5 parts by weight, the peel strength is increased, resulting in the transfer of pressure sensitive adhesive composition to the adherend when a protection film is removed from the adherend. On the contrary, when the content is more than 5.0 parts by weight, the adhesion of the pressure sensitive adhesive is decreased, and thus the protection film cannot properly protect the adherend.

The acrylic pressure sensitive adhesive composition may have a crosslinking density ranging from 50 to 99%. When the crosslinking density is less than 50%, the cohesion of the pressure sensitive adhesive is decreased, and when the crosslinking density is more than 99%, durability decreases and edge lifting may occur.

The acrylic pressure sensitive adhesive composition may further include other additives, such as tackifier resins, acrylic low molecular weight substances, epoxy resins, hardening agents, UV stabilizers, antioxidants, coloring agents, reinforcing agents, fillers, plasticizers, surfactants, forming agents, antifoaming agents, or organic salts.

A method of preparing the acrylic pressure sensitive adhesive composition is not particularly limited, but for evenly coating the pressure sensitive adhesive, crosslinking between functional groups of a multifunctional crosslinking agent should not occur during a mixing step performed to form an adhesive layer. After coating, a crosslinking structure is formed through drying and aging, resulting in the adhesive layer having elasticity and strong cohesion. Here, due to the strong cohesion, a pressure sensitive adhesive product has enhanced adhesive properties such as durability and cutting characteristics.

The present invention also provides a protection film including a base film and an adhesive layer formed at one or both sides of the base film and containing the acrylic pressure sensitive adhesive composition according to the present invention.

The protection film is formed of a base film and an adhesive layer to protect an optical film, preferably, the outermost layer of a polarizer. In the protection film, the adhesive layer formed of the pressure sensitive adhesive composition may be coated on one or both surfaces of the base film. The base film may be transparent, which may be a cellulose film, a polyester film such as a polycarbonate or polyethylene terephthalate film, a polyether film such as a polyethersulfone film, a polyolefin film such as a polyethylene or polypropylene film, a polyolefin film having a cyclic or norbornene structure, or a polyolefin film such as an ethylene-propylene copolymer film. However, the present invention is not limited to these examples. The transparent base film may be a single- or multi-layered film, and the thickness thereof may vary according to its use. However, it is preferable that the base film is formed to a thickness of 5 to 500 m, and more preferably, 15 to 100 m.

To facilitate adhesion between the transparent base film and the transparent base film, one or both surfaces of the transparent base film may be surface-treated or coated with a primer. Also, an antistatic layer or an anti-contamination layer may be laminated on the surface(s).

A method of forming the adhesive layer on the polarizing film is not particularly limited. However, generally, the method is carried out by coating the pressure sensitive adhesive on the surface of the base film or directly on the polarizing film using a bar coater and then drying it, or applying the pressure sensitive adhesive on a peelable base film surface and then drying it, and transferring the adhesive layer formed on the peelable base film surface to a surface of the polarizing film and then aging it. Here, the thickness of the pressure sensitive adhesive may be in the range from 2 to 100 m, and preferably, 5 to 50 m.

The present invention also provides a polarizer including a polarizing film, and an adhesive layer formed on one or both surfaces of the polarizing film and containing the acrylic pressure sensitive adhesive composition according to the present invention.

A polarizing film or element constituting the polarizer is not particularly limited, but the polarizing film may be prepared by elongation by adding a polarizing component such as iodine or dichroic dye to a polyvinylalcohol resin film. The thickness of the polarizing film is not particularly limited, which may be a conventional thickness. Here, the polyvinylalcohol resin may be a polyvinylalcohol-, polyvinylformal-, polyvinylacetal- or ethylene-vinyl acetate copolymer hydrolysate.

On both sides of the polarizing film, protection films are laminated to form a multi-layered film. The protection films may be a cellulose film such as a triacetyl cellulose film, a polyester film such as polycarbonate film or a polyethylene terephthalate film, a polyether sulfone film, and a polyolefin film such as a polyethylene film, a polypropylene film, a polyolefin film having a cyclic or norbornene structure or a polyolefine film such as an ethylene-propylene copolymer film. There is no limitation on thickness of the protection films, which means a conventional film thickness is acceptable.

On the one or both surfaces of the polarizer of the present invention, at least one layer providing additional functions may be formed. The at least one layer providing additional functions may be a protection layer, a reflective layer, an anti-glare layer, a phase retardation layer, a compensation layer for wide viewing angle, and a brightness enhancing layer. The polarizer and/or protection film to which the pressure sensitive adhesive is applied may be applied to any common liquid crystal display, and the kind of liquid crystal panel is not particularly limited. It is preferable that a liquid crystal display is formed by attaching the pressure sensitive adhesive-applied polarizer and/or protection film on one or both surfaces of a liquid crystal cell.

Meanwhile, the acrylic pressure sensitive composition may be used for industrial sheets, for example, protection films, reflective sheets, structural adhesive sheets, photographic adhesive sheets, lane-marking adhesive sheets, optical adhesive sheets, or electronic adhesive sheets. The composition may also be applied in other applications equally operated like multi-layered laminate products, including common industrial adhesive sheets, medical patches and heat-activated adhesives.

MODE FOR INVENTION

Examples will now be described to enable a better understanding of the present invention. However, it should be clear that these examples are not intended to limit the scope of the present invention.

Preparation Example 1

A monomer mixture composed of 93 parts by weight of 2-ethyl hexyl acrylate (EHA), 4 parts by weight of a compound represented by Formula 2, and 3 parts by weight of 2-hydroxyethylmethacrylate (HEMA), and 100 parts by weight of ethyl acetate (EAc), as a solvent, were put into a 1 L reactor equipped with a cooling system for reflux of nitrogen gas and regulation of temperature. To eliminate oxygen, nitrogen gas was purged for 60 minutes while the temperature was maintained at 70?. After homogenization, 0.1 parts by weight of 2,2-azobis(2-methylbutyronitrile) (Wako, V-59) was added as a reaction initiator. The mixture was reacted for 6 hours, and the resulting product was diluted with ethyl acetate. Finally, an acrylic copolymer (A-1) having a solid content of 44% by weight, a weight average molecular weight of 780,000, and a molecular weight distribution of 7.0 was obtained. The specific monomer (Formula 2) was prepared according to the method disclosed in Japanese Patent Publication No. 2006-327986.

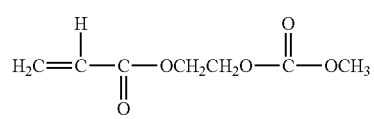

[Formula 2]

Preparation Example 2

Preparation of an acrylic copolymer was carried out under the same conditions and with the same composition as Preparation Example 1, except for use of a compound represented by Formula 3 instead of the compound represented by Formula 2. After reaction, the resulting product was diluted with ethyl acetate, yielding an acrylic copolymer (A-2) having a solid content of 44% by weight, a weight average molecular weight of 700,000, and a molecular weight distribution of 6.5. The specific monomer (Formula 3) was prepared according to the method disclosed in Japanese Patent Publication No. 1995-300444.

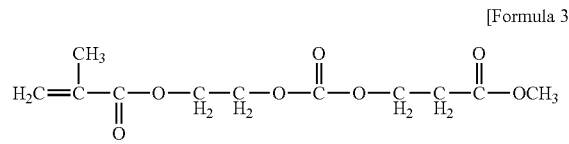

[Formula 3]

Preparation Example 3

Preparation of an acrylic copolymer was carried out under the same conditions and with the same composition as Preparation Example 1, except for use of 2-(methacryloyloxy)ethyl acetoacetate represented by Formula 4 (Aldrich) instead of the compound represented by Formula 2. After reaction, the resulting product was diluted with ethyl acetate, yielding an acrylic copolymer (A-3) having a solid content of 44% by weight, a weight average molecular weight of 750,000, and a molecular weight distribution of 6.2.

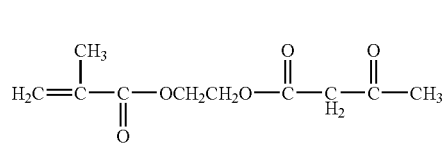

[Formula 4]

Preparation Example 4

Preparation of an acrylic copolymer was carried out under the same conditions and with the same composition as Preparation Example 1, except for use of 2-(acryloyloxy)ethyl acetoacetate represented by Formula 5 (Aldrich)

instead of the compound represented by Formula 2. After reaction, the resulting product was diluted with ethyl acetate, yielding an acrylic copolymer (A-4) having a solid content of 44% by weight, a weight average molecular weight of 740,000, and a molecular weight distribution of 6.0.

[Formula 5]

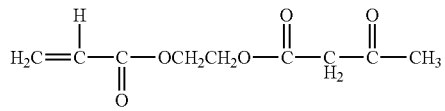

Preparation Examples 5 and 6

Preparation of an acrylic copolymer was carried out by the same method as Preparation Example 1, except for variation in components and composition ratio as listed in Table 1.

TABLE 1

|  | Preparation Examples | | | | | |
|---|---|---|---|---|---|---|
|  | 1 A-1 | 2 A-2 | 3 A-3 | 4 A-4 | 5 B-1 | 6 B-2 |
| 2-EHA | 93 | 93 | 93 | 93 | 97 | 97 |
| Specific monomer | 4 | 4 | 4 | 4 | — | 20 |
| HEMA | 3 | 3 | 3 | 3 | 3 | 3 |
| V-59 | 0.1 | 0.1 | 0.1 | 0.1 | 0.1 | 0.1 |
| EAc | 100 | 100 | 100 | 100 | 100 | 100 |
| Solid content (weight %) | 44 | 44 | 44 | 44 | 44 | 44 |
| Weight average molecular weight (10 thousand units) | 78 | 70 | 75 | 74 | 72 | 70 |
| Molecular weight distribution | 7.0 | 6.5 | 6.2 | 6.0 | 5.7 | 6.0 |

2-EHA: 2-ethylhexyl acrylate
HEMA: 2-hydroxyethylmethacrylate
V-59: 2,2'-azobis(2-methylbutyronitrile)
EAc: ethylacetate Example 1

Mixing Step

To 100 parts by weight of the acrylic copolymer (A-1) prepared in Preparation Example 1, 5.0 parts by weight of hexamethylenediisocyanate prepolymer (HDI) and 1.0 part by weight of a glycol ester chelating agent (Rhenosin RC-100, Rhein Chemie, Germany) as crosslinking agents, and 0.1 part by weight of NaClO$_4$ as an alkali metal salt were added. The mixture was diluted to a proper concentration, homogenized, and then coated on one surface of a biaxially-elongated polyethyleneterephthalate film having a thickness of 38 m, followed by drying it. Finally, an even adhesive layer was formed to a thickness of 20 m.

Laminating Step

A release film was laminated on the adhesive layer coated on the polyethyleneterephthalate film, and then maintained at a temperature of 23° and a humidity of 55% for 4 days for sufficient aging. The formed protection film was cut into proper sizes, and then the cut samples were adhered to a triacetyl cellulose film side (TAC film, Fuji Film, Japan) and an anti-glare triacetyl cellulose film side (AG TAC film, DNP, Japan) of the polarizer for evaluation.

Examples 2-12 and Comparative Examples 1-2

Preparation of a pressure sensitive adhesive composition was carried out by the same method as Example 1, except for mixing components with composition ratios as listed in Table 2.

TABLE 2

|  | Acrylic copolymers | Metal salt NaClO$_4$ | Chelating agent RC-100 | Crosslinking agent |
|---|---|---|---|---|
| Example 1 | A-1 | 0.1 | 0 | 5.0 |
| Example 2 | A-1 | 0.1 | 1 | 5.0 |
| Example 3 | A-1 | 0.1 | 2 | 5.0 |
| Example 4 | A-2 | 0.1 | 0 | 5.0 |
| Example 5 | A-2 | 0.1 | 1 | 5.0 |
| Example 6 | A-2 | 0.1 | 2 | 5.0 |
| Example 7 | A-3 | 0.1 | 0 | 5.0 |
| Example 8 | A-3 | 0.1 | 1 | 5.0 |
| Example 9 | A-3 | 0.1 | 2 | 5.0 |
| Example 10 | A-4 | 0.1 | 0 | 5.0 |
| Example 11 | A-4 | 0.1 | 1 | 5.0 |
| Example 12 | A-4 | 0.1 | 2 | 5.0 |
| Comparative Example 1 | B-1 | 0.1 | 2 | 5.0 |
| Comparative Example 2 | B-2 | 0.1 | 2 | 5.0 |

NaClO$_4$ - sodium perchlorate

Protection films including an adhesive layer composed of the pressure sensitive adhesive composition prepared each in Examples 1 to 12 and Comparative Examples 1 and 2 were tested to evaluate Gel fraction, low-rate peel strength, high-rate peel strength, wettability, and peeling static voltage. The test results are shown in Table 3.

Gel Fraction

The pressure sensitive adhesives dried during the mixing step according to Examples 1 to 12 and Comparative Examples 1 and 2 were maintained in a constant temperature and humidity chamber (23°, 60% RH) for about 10 days. About 0.3 g of the pressure sensitive adhesive was put into a #200 stainless steel mesh and dipped into 100 ml of ethyl acetate. Afterward, the resulting product was stored in a dark room at room temperature for 2 days, and then insoluble contents were isolated therefrom. The insoluble contents were dried in an oven at 70° for 4 hours and their weights were measured.

Low-Rate/High-Rate Peel Strength

The protection films prepared according to Examples 1 to 12 and Comparative Examples 1 and 2 were adhered to a triacetyl cellulose (TAC, Fuji film, Japan) side and an anti-glare triacetyl cellulose (AG TAC, DNP, Japan) side of the polarizer by a 2 kg roller on the basis of JIS Z 0.27, and the protection film-adhered polarizer was maintained at 23° and a humidity of 65% for 24 hours. The low-rate/high-rate peel strengths were measured by a tensile tester operated with an angle of 180 and at a peeling rate of 0.3 m/min(low) and 30 m/min(high).

Static Electricity

The protection film-adhered polarizers prepared according to Examples 1 to 12 and Comparative Examples 1 and 2 were cut into 25 cm×22 cm samples and stored at 23° and a relative humidity of 50% for 24 hours. The static electricity generated on the polarizer surface was measured by a static electricity tester, STATIRON-M2, at 1 cm height from the surface during peeling-off of the sample at a peeling rate of 40 m/min.

Wettability

The protection film-adhered polarizers prepared according to Examples 1 to 12 and Comparative Examples 1 and 2 were cut into 2.5 cm×25 cm samples and adhered to glass surfaces with double-sided tape. After that, the protection film was peeled off and a trisectional point in the length was pressed by finger at uniform pressure. The full-wetting time for the polarizer surface was measured and evaluated under the following criteria:

| | Criteria |
|---|---|
| 1 | Less than 10 seconds to fully wet polarizer surface |
| 2 | Less than 15 seconds to fully wet polarizer surface |
| 3 | Less than 20 seconds to fully wet polarizer surface |
| 4 | Less than 30 seconds to fully wet polarizer surface |

TABLE 3

| | Gel fraction (%) | Low-rate peel strength (gf/in) | | High-rate peel strength (gf/in) | | Static electricity (kV) | | Wettability |
|---|---|---|---|---|---|---|---|---|
| | | TAC | AG | TAC | AG | TAC | AG | |
| Example 1 | 90 | 8.5 | 9.5 | 125 | 120 | 0.35 | 0.25 | 2 |
| Example 2 | 91 | 5.2 | 6.5 | 110 | 100 | 0.40 | 0.35 | 2 |
| Example 3 | 89 | 3.8 | 4.5 | 95 | 90 | 0.35 | 0.20 | 1 |
| Example 4 | 90 | 9.1 | 10.8 | 130 | 135 | 0.45 | 0.30 | 2 |
| Example 5 | 92 | 4.0 | 6.2 | 100 | 95 | 0.45 | 0.40 | 2 |
| Example 6 | 91 | 3.5 | 5.3 | 115 | 95 | 0.37 | 0.30 | 1 |
| Example 7 | 90 | 7.3 | 11.0 | 110 | 100 | 0.15 | 0.25 | 2 |
| Example 8 | 89 | 4.9 | 12.3 | 100 | 110 | 0.20 | 0.40 | 2 |
| Example 9 | 91 | 3.0 | 7.1 | 100 | 95 | 0.15 | 0.20 | 1 |
| Example 10 | 92 | 7.5 | 8.0 | 110 | 100 | 0.15 | 0.20 | 2 |
| Example 11 | 89 | 5.0 | 5.5 | 95 | 90 | 0.20 | 0.30 | 2 |
| Example 12 | 90 | 3.5 | 4.0 | 100 | 90 | 0.20 | 0.30 | 1 |
| Comparative Example 1 | 91 | 3.0 | 3.5 | 107 | 100 | 0.20 | 0.25 | 2 |
| Comparative Example 2 | 90 | 4.0 | 5.5 | 160 | 180 | 0.65 | 0.70 | 2 |

As shown in Table 3, when the acrylic copolymers prepared according to Examples 1 to 12 were used for pressure resistant adhesive resins, the resin itself functioned as a chelating agent, resulting in enhancement of physical properties even with smaller amounts of additives than in Comparative Examples 1 and 2. It can be also confirmed that they exhibited excellent pressure sensitive adhesive properties such as higher low-rate peel strength and equal or lower high-rate peel strength than in Comparative Examples 1 and 2. In addition, when too much of the acrylic copolymer was added, the high-rate peel strength remarkably increased.

According to the present invention, an acrylic pressure sensitive adhesive composition can effectively reduce an amount of an antistatic agent added to prevent generation of static electricity, and exhibits an excellent balance between low-rate peel strength and high-rate peel strength in a protection film, a polarizer and a liquid crystal display to which the acrylic pressure sensitive adhesive composition is applied.

Exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

The invention claimed is:

1. A protection film, comprising:
   a base; and
   an adhesive layer that comprises an acrylic pressure sensitive adhesive composition and is formed on one or both surfaces of the base,
   wherein the composition comprises:
      (i) an acrylic copolymer prepared by copolymerization of monomers comprising: 90 to 99.9 parts by weight of (meth)acrylic ester monomer having C1-C12 alkyl, 0.1 to 10 parts by weight of a monomer represented by Formula 3, and 0.1 to 10 parts by weight of a monomer having a crosslinking functional group, relative to 100 parts by weight of the total monomers;
      (ii) a crosslinking agent;
      (iii) a chelating agent capable of forming a bond with a metal ion, wherein the chelating agent is present in an amount of 0.01 or more and less than 2 parts by weight, relative to 100 parts by weight of the acrylic copolymer; and
      (iv) a metal salt, wherein the metal salt is present in an amount of 0.001 or more and less than 0.3 parts by weight, relative to 100 parts by weight of the acrylic copolymer,
   wherein the base comprises one or more films selected from the group consisting of a cellulose film, a polyester film, a polyether film and a polyolefin film, and
   wherein the adhesive layer has a low-rate peel strength of 3.5-9.1 gf/in for a triacetyl cellulose film and 5.3-10.8 gf/in for an anti-glare triacetyl cellulose film with an angle of 180° at a peeling rate of 0.3 m/min, and a high-rate peel strength of 100-130 gf/in for a triacetyl cellulose film and 95-135 gf/in for an anti-glare triacetyl cellulose film with an angle of 180° at a peeling rate of 30 m/min:

[Formula 3]

$$H_2C=\underset{R_1}{C}-\underset{\|}{\overset{O}{C}}-(O-R_2-O-\underset{\|}{\overset{O}{C}})_n(O-R_3-\underset{\|}{\overset{O}{C}})_m OR_4$$

wherein, $R_1$ is hydrogen or C1-C10 alkyl; $R_2$ and $R_3$ are independently C1-C10 alkylene; $R_4$ is phenyl, benzyl, C1-C10 alkyl or C1-C10 alkoxyalkyl; m is 0 or an integer from 1 to 6; and n is an integer from 1 to 100, with proviso that m is 0, n is an integer from 2 to 100.

2. The protection film according to claim 1, wherein the (meth)acrylic ester monomer having C1-C12 alkyl comprises at least one selected from the group consisting of methyl(meth)acrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl (meth)acrylate, 2-ethylhexyl(meth)acrylate, n-octyl(meth)acrylate, isooctyl(meth)acrylate, isononyl(meth)acrylate, lauryl(meth)acrylate, and tetradecyl(meth)acrylate.

3. The protection film according to claim 1, wherein the monomer having a crosslinkable functional group contains an acidic group, a hydroxyl group or a nitrogen atom in its structure.

4. The protection film according to claim 1, wherein the monomers for the acrylic copolymer further comprise 0 to 20 parts by weight of a functional monomer represented by Formula 5:

[Formula 5]

$$\underset{R_5}{\overset{H}{\diagdown}}C=C\underset{R_6}{\overset{H}{\diagup}}$$

wherein, $R_5$ is hydrogen or alkyl; $R_6$ is cyano, alkyl-substituted or unsubstituted phenyl, acetyloxy, or $COR_7$; and $R_7$ is alkyl-substituted or unsubstituted amino or glycidyloxy.

5. The protection film according to claim 1, wherein the chelating agent comprises at least one selected from the group consisting of oxalate compound, diamine compound, polyhydric carboxyl compound and ketone compounds.

6. The protection film according to claim 1, wherein the metal salt comprises a metal cation selected from the group consisting of lithium, sodium, potassium, magnesium, calcium, barium and cesium; and an anion selected from the group consisting of $Cl^-$, $Br^-$, $I^-$, $BF_4^-$, $PF_6^-$, $AsF^-$, $ClO_4^-$, $NO_2^-$, $CO_3^-$, $N(CF_3SO_2)_2^-$, $N(CF_3CO)_2^-$, $N(C_2F_5SO_2)^-$, $N(C_2F_5CO)_2^-$, $N(C_4F_9SO_2)_2^-$, $C(CF_3SO_2)_3^-$ and $CF_3SO_3^-$.

7. The protection film according to claim 1, wherein the crosslinking agent comprises at least one selected from the group consisting of isocyanate compound, epoxy compound, aziridine compound and metal chelate compounds.

8. The protection film according to claim 1, wherein the crosslinking agent is comprised in an amount of 0.5 to 5 parts by weight, relative to 100 parts by weight of the acrylic copolymer.

9. The protection film according to claim 1, which has a crosslinking density of 50 to 99%.

10. The protection film according to claim 1, wherein the adhesive layer has a thickness of 2 to 100 μm.

11. A polarizer, comprising:
the protection film according to claim 1.

12. The polarizer according to claim 11, further comprising: at least one functional layer selected from the group consisting of a protection layer, a reflective layer, an anti-glare layer, a phase retardation layer, a compensation layer for wide viewing angle, and a brightness enhancing layer.

13. A liquid crystal display, comprising: a liquid crystal panel in which the polarizer according to claim 11 is adhered on one or both surfaces of a liquid crystal cell.

14. A protection film, comprising:
a base; and
an adhesive layer that comprises an acrylic pressure sensitive, adhesive composition and is formed on one or both surfaces of the base,
wherein the composition comprises:
(i) an acrylic copolymer prepared by copolymerization of monomers comprising:
90 to 99.9 parts by weight of (meth)acrylic ester monomer having C1-C12 alkyl, 0.1 to 10 parts by weight of a monomer represented by Formula 3, and 0.1 to 10 parts by weight of a monomer having a crosslinking functional group, relative to 100 parts by weight of the total monomers;
(ii) a crosslinking agent;
(iii) a chelating agent capable of forming a bond with a metal ion, wherein the chelating agent is present in an amount of 0 or more and less than 2 parts by weight, relative to 100 parts by weight of the acrylic copolymer; and
(iv) a metal salt, wherein the metal salt is present in an amount of 0.001 or more and less than 0.3 parts by weight, relative to 100 parts by weight of the acrylic copolymer,
wherein the base comprises one or more films selected from the group consisting of a cellulose film, a polyester film, a polyether film and a polyolefin film, and
wherein the adhesive layer has a low-rate peel strength of 3.5-9.1 gf/in for a triacetyl cellulose film and 5.3-10.8 gf/in for an anti-glare triacetyl cellulose film with an angle of 180° at a peeling rate of 0.3 m/min, and a high-rate peel strength of 100-130 gf/in for a triacetyl cellulose film and 95-135 gf/in for an anti-glare triacetyl cellulose film with an angle of 180° at a peeling rate of 30 m/min:

[Formula 3]

$$H_2C=\underset{R_1}{C}-\underset{\|}{\overset{O}{C}}-(O-R_2-O-\underset{\|}{\overset{O}{C}})_n(O-R_3-\underset{\|}{\overset{O}{C}})_m OR_4$$

wherein, $R_1$ is hydrogen or C1-C10 alkyl; $R_2$ and $R_3$ are independently C1-C12 alkylene; $R_4$ is phenyl, benzyl, C1-C10 alkyl or C1-C10 alkoxyalkyl; m is 0 or an integer from 1 to 6; and n is an integer from 1 to 100, with proviso that m is 0, n is an integer from 2 to 100.

15. The protection film of claim 14, wherein the amount of the chelating agent in the composition is 0 part by weight.

* * * * *